US012626942B2

(12) United States Patent
Hahn et al.

(10) Patent No.: US 12,626,942 B2
(45) Date of Patent: May 12, 2026

(54) INTEGRATED FUEL CELL INJECTION UNIT USING ADDITIVE MANUFACTURING

(71) Applicant: GM GLOBAL TECHNOLOGY OPERATIONS LLC, Detroit, MI (US)

(72) Inventors: Joseph Hahn, White Lake Township, MI (US); Patrick J. Eding, Fremont, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 546 days.

(21) Appl. No.: 18/334,633

(22) Filed: Jun. 14, 2023

(65) Prior Publication Data

US 2024/0421331 A1      Dec. 19, 2024

(51) Int. Cl.
| | |
|---|---|
| *H01M 8/04746* | (2016.01) |
| *B33Y 10/00* | (2015.01) |
| *H01M 8/04014* | (2016.01) |
| *H01M 8/04082* | (2016.01) |
| *H01M 8/04089* | (2016.01) |
| *H01M 8/04992* | (2016.01) |

(52) U.S. Cl.
CPC ......... *H01M 8/04753* (2013.01); *B33Y 10/00* (2014.12); *H01M 8/04014* (2013.01); *H01M 8/04097* (2013.01); *H01M 8/04201* (2013.01); *H01M 8/04992* (2013.01)

(58) Field of Classification Search
CPC ......... H01M 8/04753; H01M 8/04014; H01M 8/04097; H01M 8/04201; H01M 8/04992; B33Y 10/00
USPC ....................................................... 429/415
See application file for complete search history.

(56) References Cited

U.S. PATENT DOCUMENTS

| | | | |
|---|---|---|---|
| 11,713,734 B1* | 8/2023 | Kou ................... | F02M 21/0227 |
| | | | 123/445 |
| 2009/0155641 A1* | 6/2009 | Senner .............. | H01M 8/04097 |
| | | | 137/7 |
| 2011/0294028 A1* | 12/2011 | Hannesen ........... | H01M 8/2484 |
| | | | 429/455 |
| 2015/0214566 A1* | 7/2015 | Jung ................... | H01M 8/0267 |
| | | | 429/458 |

(Continued)

FOREIGN PATENT DOCUMENTS

| | | |
|---|---|---|
| DE | 102014105995 A1 | 11/2014 |
| DE | 102021203564 A1 | 10/2022 |
| WO | 2019178628 A1 | 9/2019 |

OTHER PUBLICATIONS

German Office Action dated Mar. 13, 2024.

*Primary Examiner* — James M Erwin
(74) *Attorney, Agent, or Firm* — Quinn IP Law

(57)      ABSTRACT
Aspects of integrated hydrogen fuel cell injection units herein use additive manufacturing to form a single part. A space between a body and an ejector nozzle/venturi tube system forms an attenuation volume. The heat exchanger is integrated within the attenuation volume, saving space. The ejector nozzle/venturi tube, and the stack anode inlet to the fuel cell, are arranged through the heat exchanger and allow an injector at the base of the body to selectively emit hydrogen into the anode of the fuel cell. This architecture obviates the need for many O-rings and bolts used in present fuel injection systems using existing manufacturing techniques that may be unduly large and unwieldy and that may cause hydrogen leakage at different connection points.

20 Claims, 5 Drawing Sheets

(56)        References Cited

U.S. PATENT DOCUMENTS

| | | | |
|---|---|---|---|
| 2016/0056484 A1* | 2/2016 | Mizumoto | B60L 3/0053 |
| | | | 429/444 |
| 2018/0123151 A1* | 5/2018 | Cunningham | H01M 8/04201 |
| 2021/0111417 A1* | 4/2021 | Shimotori | H01M 8/0267 |
| 2023/0238550 A1* | 7/2023 | Jung | B01F 25/31252 |
| | | | 429/415 |

* cited by examiner

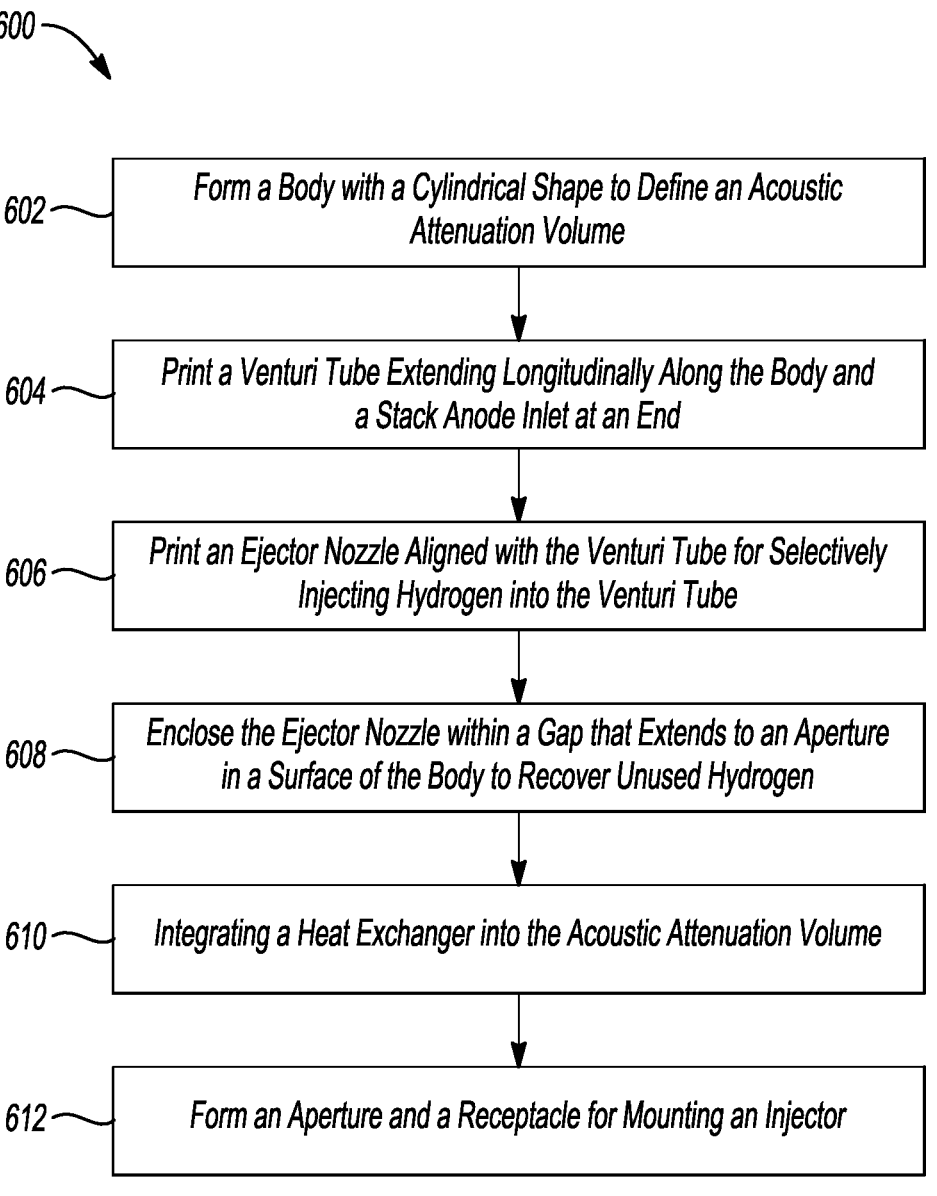

600

602 — Form a Body with a Cylindrical Shape to Define an Acoustic Attenuation Volume 604 — Print a Venturi Tube Extending Longitudinally Along the Body and a Stack Anode Inlet at an End 606 — Print an Ejector Nozzle Aligned with the Venturi Tube for Selectively Injecting Hydrogen into the Venturi Tube 608 — Enclose the Ejector Nozzle within a Gap that Extends to an Aperture in a Surface of the Body to Recover Unused Hydrogen 610 — Integrating a Heat Exchanger into the Acoustic Attenuation Volume 612 — Form an Aperture and a Receptacle for Mounting an Injector

*Fig-6*

INTEGRATED FUEL CELL INJECTION UNIT USING ADDITIVE MANUFACTURING

INTRODUCTION

An injection unit may be used to controllably inject a fuel, such as hydrogen, into a fuel cell of a vehicle in order to generate electricity and propel the vehicle via an electric motor. One advantage of a hydrogen-fueled vehicle is that, unlike gasoline-controlled combustion engines that emit carbon monoxide, the primary byproduct of a hydrogen system is water vapor, thereby eliminating most toxic emissions.

Injection units typically function by injecting a fuel, such as hydrogen, into the anode portion of a hydrogen fuel cell (or stack), within which an electricity-producing combustion reaction occurs. Prior to actual injection of hydrogen into the fuel cell, various preparation steps are taken using different connected components. For example, the hydrogen is heated using a heat exchanger. Noise is muffled via an attenuator. The hydrogen is also mediated to an appropriate pressure and velocity using various nozzles and injection elements. These elements may assist in reconstituting unused hydrogen from a prior cycle and in injecting hydrogen into the fuel cell using a streamlined ejector assembly.

Modern fuel cell injection units are bulky and unwieldy, and susceptible to hydrogen leakage. To connect the different components of the injection unit together, bolts and O-rings are needed. The bulky noise attenuator is especially subject to leakage, and complex forging techniques are often employed to combat this phenomenon. These injection units may still have a number of points where leakage is significant. Because regular isotopes of hydrogen atoms consist of a single proton and a single electron (often bonded in molecular form to another such atom), the fuel is physically very small and permeates through the smallest apertures. Leakage is particularly abundant in elastomeric seals such as the O-rings, which are commonly used in injection units, and other connectors between different components. This leakage contributes to fuel loss and an increase in unwanted hydrogen emissions.

SUMMARY

In one aspect of the present disclosure, an additively manufactured hydrogen fuel cell injection unit includes a body including a noise attenuation volume, a first end of the body including an aperture for mounting an injector; an ejector assembly including an ejector tube and a stack anode inlet positioned at a second end of the body, the stack anode inlet configured to inject hydrogen into a fuel cell; a heat exchanger integrated within the noise attenuation volume and including a triply-periodic minimal surface (TPMS) lattice of unit cells arranged therein, the TPMS lattice being configured to heat hydrogen flowing therethrough, each end surface of the heat exchanger separated from the first and second ends of the body by a respective volume; and an ejector nozzle coupled to an interior of the body and aligned with the injector at the first end of the body, the ejector nozzle surrounded by a gap, the gap leading to a recycle path inlet of the body for recapturing residual hydrogen proximate the recycle path inlet; wherein the ejector tube protrudes through the heat exchanger and is aligned with the ejector nozzle such that the ejector tube passes the hydrogen to the stack anode inlet.

In various aspects, the hydrogen passed to the stack anode inlet includes (1) pressurized hydrogen sourced from the injector nozzle, (2) the residual hydrogen in the gap, and (3) the hydrogen exiting the heat exchanger. The second end of the body includes an inlet for receiving hydrogen from a source. A volume between the first end surface of the heat exchanger and the first end of the body defines a first volume. A second end surface of the heat exchanger adjacent the second volume is shaped in a geometrical gradient configured to enable the leftover hydrogen received at the inlet at the second end of the body to evenly distribute across the second volume when entering the heat exchanger to enable a uniform heat increase of the hydrogen.

In various embodiments, the second end surface of the heat exchanger is proximate to the second volume into which the hydrogen flows. The first end surface of the heat exchanger defines a lower part of the first volume and is shaped to form a gradient for a more even distribution of the heated hydrogen. In an embodiment, the gradient is shaped at least partly conical. The TPMS lattice includes a plurality of unit cells having two channels, wherein a first channel passes hydrogen through the heat exchanger and a second channel passes a fluid to heat the hydrogen.

In various embodiments, a side of the body includes two apertures for passing fluid through the second channel of the heat exchanger. The ejector nozzle may be configured to selectively activate to controllably pass hydrogen flowing from a heat exchanger surface proximate the first end of the body through the ejector tube for emission into the fuel cell. Activation of the injector is configured to create a low pressure zone in the gap to pull the residual hydrogen through the ejector nozzle end effector tube into the stack anode inlet.

In another aspect of the disclosure, an additively manufactured fuel cell injection unit includes a body having a noise attenuation volume therein. The first end of the body includes an aperture for mounting a hydrogen injector. An ejector assembly includes an ejector tube having a stack anode inlet positioned at an output of the ejector tube for injecting hydrogen into a fuel cell. A heat exchanger includes a lattice of unit cells integrated within the noise attenuation volume. The lattice is configured to heat hydrogen flowing therethrough. Each end surface of the heat exchanger is separated from the respective first and second ends of the body by a respective volume. The surface of the heat exchanger adjacent each respective volume includes a gradient. An ejector nozzle is coupled to an interior of the body and is aligned with the injector at the first end of the body. The ejector nozzle is surrounded by a gap. The gap leads to a recycle path inlet of the body for recapturing residual hydrogen. The ejector tube protrudes through the heat exchanger and is aligned with the injector nozzle such that the ejector tube is configured to pass hydrogen to the stack anode inlet.

In various embodiments, one or both of the surfaces of the heat exchanger adjacent the respective volumes are at least partly conical in shape. The injector is selectively activated to inject hydrogen from a source into the ejector nozzle to create a low pressure region in the gap for recapturing the unused hydrogen from the last engine cycle.

The injector may further be configured to emit the heated hydrogen exiting the heat exchanger into the volume bounded by the surface of the heat exchanger into the ejector nozzle and thereafter into the ejector tube.

In various embodiments, the fuel injection unit further includes a plurality of pressure sensors co-printed within an outlet of the noise attenuation volume. The injector may be cyclically activated to inject the hydrogen when the pressure drops below a threshold. The additively manufactured body

3 and integrated noise attenuation volume and heat exchanger may be formed as a single, integral unit to eliminate the use of elastomeric seals. Elements of the body are designed to avoid sharp angles and abruptly changing edges and to instead use curved portions. The ejector tube may be a venturi tube formed using additive manufacturing without a draft angle.

In yet another aspect of the disclosure, a method for additively manufacturing a fuel injector unit includes forming a body having at least a partly cylindrical shape and defining an acoustic attenuation volume therein. The method further includes printing a venturi tube extending longitudinally along at least a part of the body from a first end to a second end, a stack anode inlet at the second end to inject hydrogen into a fuel cell. The method also includes printing an ejector nozzle aligned with the venturi tube at the first end for selectively injecting hydrogen into the venturi tube, and enclosing the ejector nozzle within a gap that extends to an aperture in a surface of the body. The gap is used for recovering residual hydrogen for emission via the ejector nozzle and the venturi tube into the stack anode inlet.

The method further includes integrating a heat exchanger into the acoustic attenuation volume. The heat exchanger includes a lattice of unit cells arranged between the venturi tube and a perimeter of the body, such that a first surface of the heat exchanger adjacent the first end includes a gradient bounding a first volume at the first end and a second surface of the heat exchanger adjacent the second end includes a gradient bounding a second volume with the second end. Hydrogen entering an inlet aperture in the second surface flows through the heat exchanger from the second volume to the first volume. The method also includes forming an aperture in the first end for mounting an injector configured to selectively emit hydrogen from the gap, the first volume, and the injector through the ejector nozzle and into the venturi tube for entry into the fuel cell at the stack anode inlet.

In various embodiments, the first or second surface of the heat exchanger is at least partly conical in shape. The body may further include a coolant input for injecting coolant into a channel of the heat exchanger, and a coolant output for receiving the coolant from the heat exchanger.

The above summary is not intended to represent every embodiment or every aspect of the present disclosure. Rather, the foregoing summary merely provides examples of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

4

Figures 1, 2:
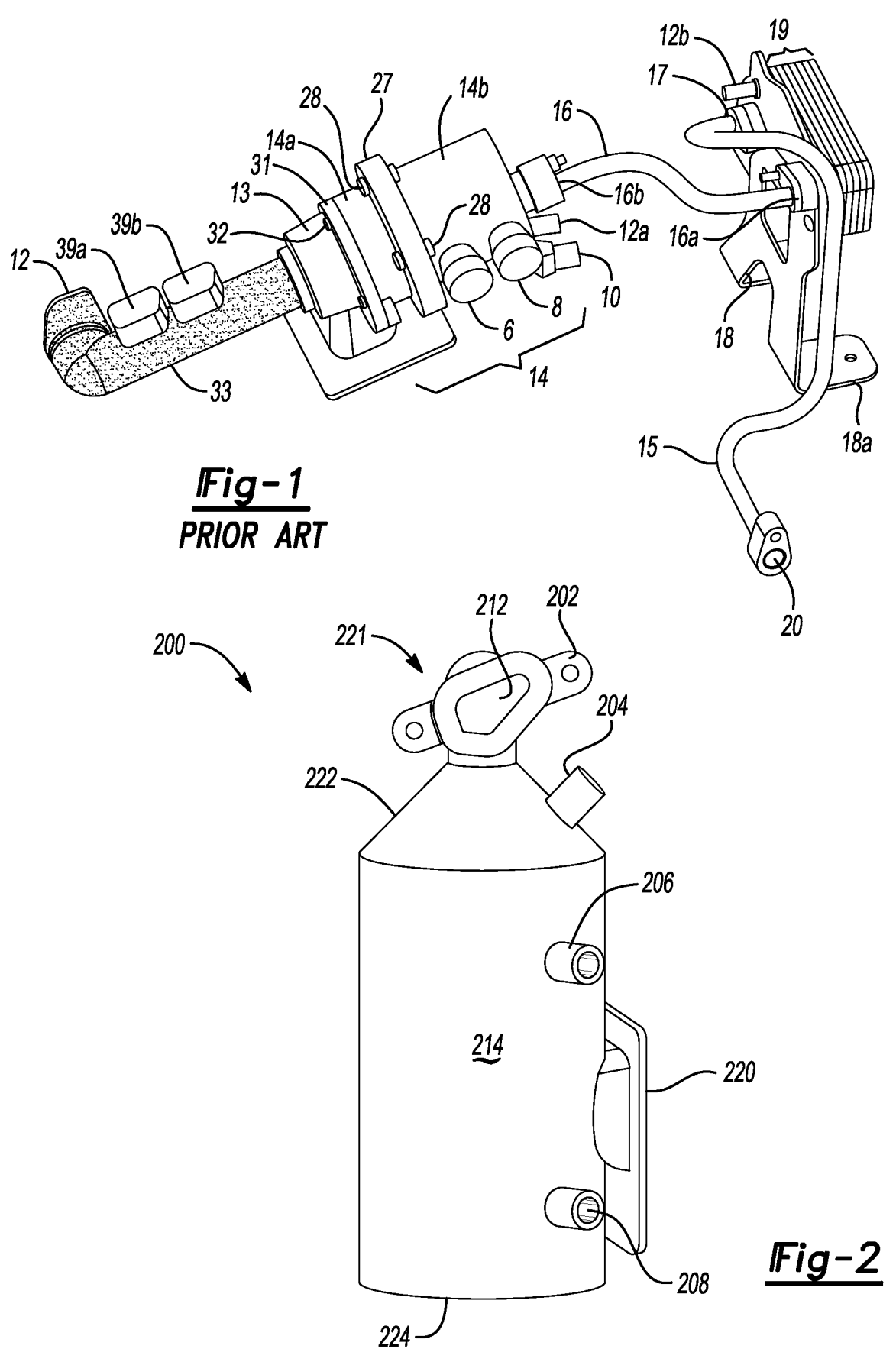
FIG. 1 is a mechanical diagram of an existing fuel injection unit.
FIG. 2 is a mechanical diagram of an additively manufactured, integrated fuel injection unit in accordance with an aspect of the disclosure.
Figure 3:
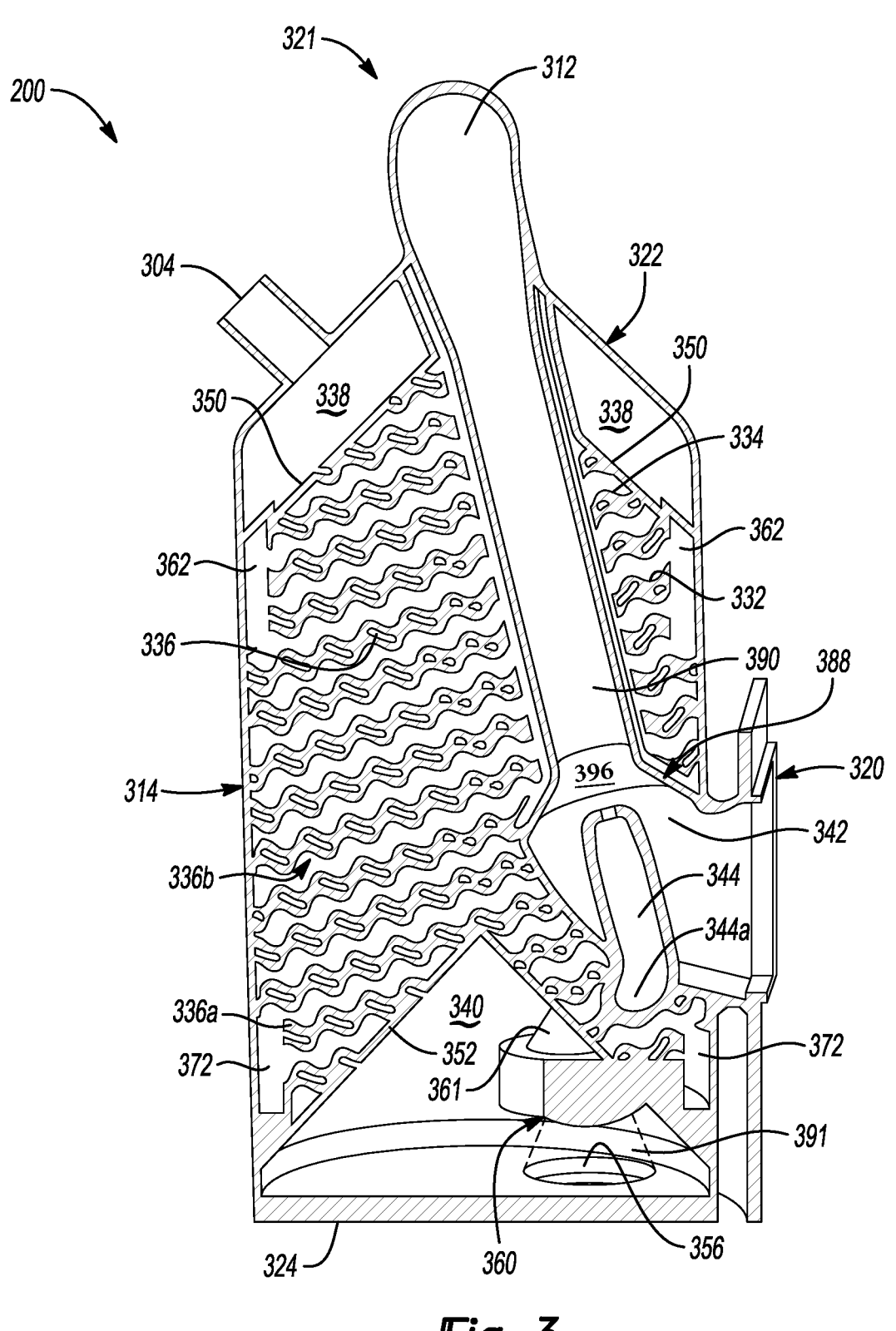

FIG. 3 is a cross section of the fuel injection unit of FIG. 2 taken along a vertical axis through the diagram, in accordance with an aspect of the disclosure.

Figure 4:
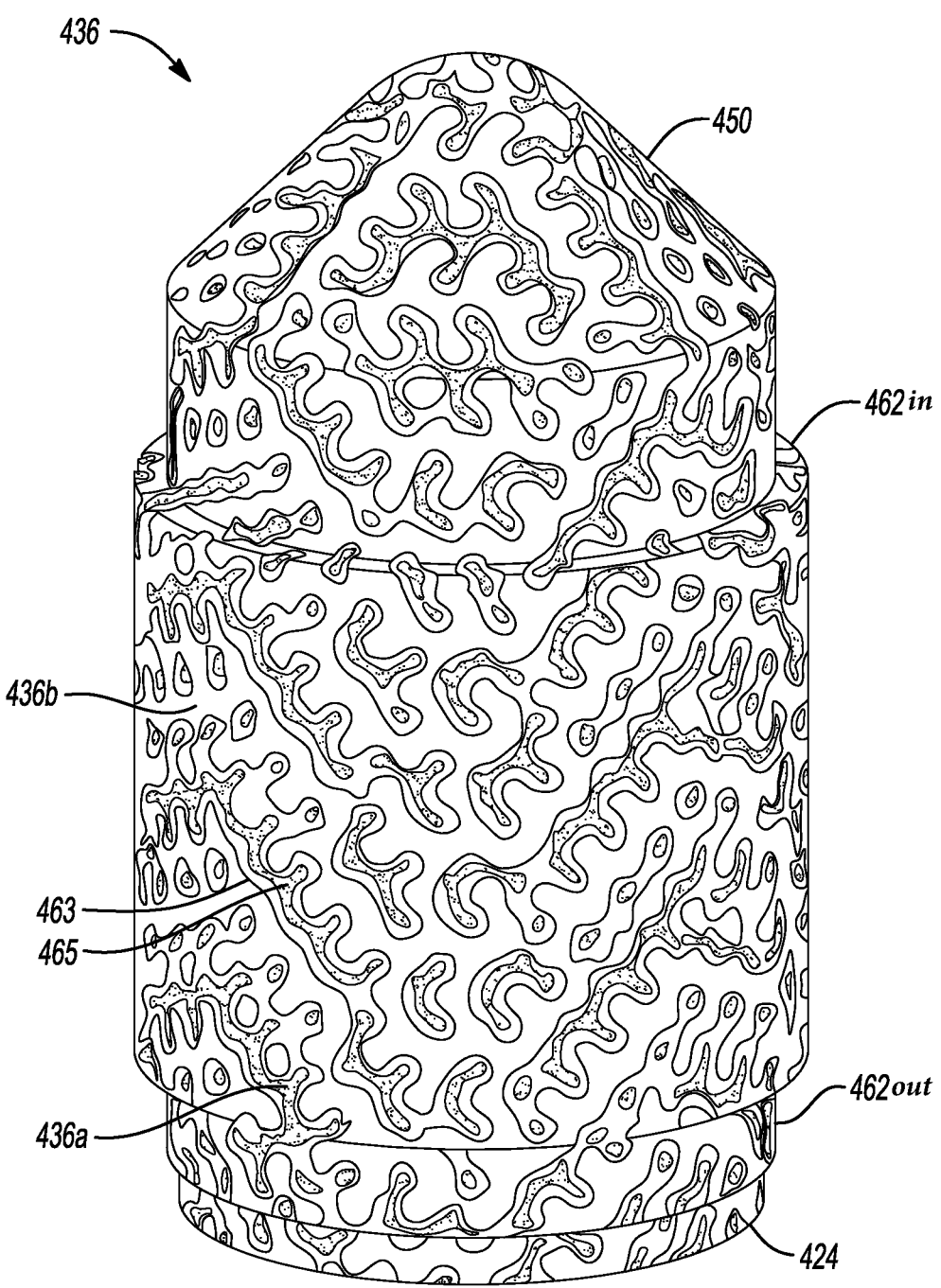

FIG. 4 is a geometrical representation of a two-channel heat exchanger in accordance with an aspect of the disclosure.

Figure 5:
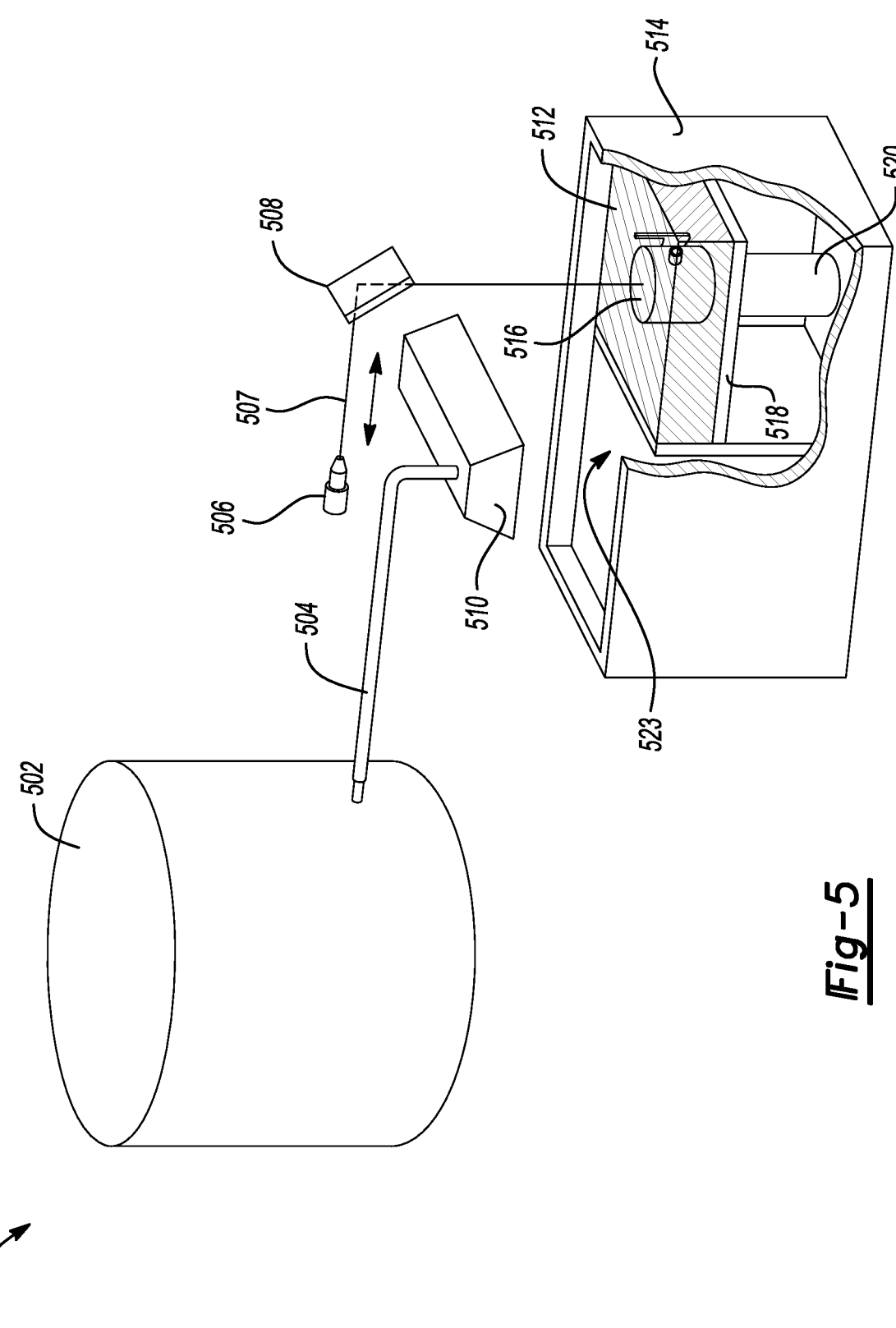

FIG. 5 is a conceptual diagram of a powder bed fusion (PDF) three-dimensional (3-D) printer for additively manufacturing metallic products such as the device of FIG. 2.

FIG. 6 is an exemplary flow diagram of a method for additively manufacturing an integrated fuel-injection unit in accordance with an aspect of the disclosure.

The appended drawings are not necessarily drawn to scale and may present a simplified representation of various features of the present disclosure, including, for example, specific dimensions, orientations, locations, and shapes. In some cases, well-recognized features in certain drawings may be omitted to avoid unduly obscuring the concepts of the disclosure. Details associated with such features will be determined in part by the particular intended application and use case environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Apparatuses, systems and methods are disclosed that use additive manufacturing, also referred to as 3-D printing, to unify the elements of a fuel injection system. The result is a much smaller and more streamlined fuel injection system. Many types of 3-D printers exist. Printers dedicated to printing metals, such as powder bed fusion (PDF) printers, may be particularly useful. For example, a CAD file is initially created that details using specialized Computer Aided Design ("CAD") software that define the shape, geometry, and properties of the device being printed, sometimes called a "build piece." Increasingly advanced 3-D printers may use advanced techniques to precisely print very small geometrical metallic and other designs, with the result being a single, integrated unit as the end build piece.

In many 3-D print applications, the CAD file is thereafter "sliced" by a slicing application, which effectively partitions the CAD-designed part into many small geometries that, when consolidated, reproduce the part. Slicing may be used because in PDF and related printers, the printed object is gradually built up from a substrate in individual slices. Each slice corresponds to a powder layer. Each of the scanned cross-sectional regions of the layers melt and thereafter solidify as the 3-D printer scans each new layer. For printing a slice of a build piece, an even layer of power may first be deposited on the substrate by a depositor. Thereafter, a laser or electron beam in the printer may be used to selectively fuse or melt areas of the slice that are deemed to be part of the component as determined by the coordinates found in each slice. The remaining unfused areas in the slice are not part of the component, and thus the powder associated with those areas is not melted, making it free to later fall off, or fall out of, the design. After the fusing process just described, the depositor may be used to deposit another powder layer atop the freshly printed layer. The laser or electron beam may then scan that layer to form the next slice in line. This process continues until each of the layers has been deposited or scanned. The result is a build piece, or printed object, that may be cleaned of excess powder.

One advantage of 3-D printing a component is that a plurality of elements may be printed as a single, discrete, uniform object. In various aspects of the disclosure, the fuel injection unit along with its various components are integrated together in a single design and then additively manufactured. The resulting fuel injection unit is significantly smaller than existing units. Equally importantly, one major problem with modern hydrogen fuel cells is hydrogen leakage. Existing fuel injection systems are built using typical subtractive manufacturing techniques, including, for example, machining, molding, tooling, extruding, forging, die casting, and the like. One problem with using just this approach is that it tends to produce a number of discrete devices that need to be bound together by some connection means. As noted above in the background section, hydrogen is a very small molecule and is subject to easy leakage out of many devices. Subtractive manufacturing techniques rely in general on the use of bolts, nuts, O-rings, brackets, and other such elements for connecting various objects together, but through which hydrogen may easily leak. The result is not just undesirable hydrogen emissions in the air, but also a significant decrease in the overall efficiency of the hydrogen vehicle as it spontaneously loses hydrogen. In addition, using molding, machining and forging as the main techniques for manufacturing tend to create sharper corners and draft angles, which may undesirably alter the efficient flow of hydrogen and create unintended emission artifacts. By contrast, the geometrical nature of additive manufacturing makes it easier to form smooth, intended surfaces that align with the actual geometrical objectives of the structure and that minimize unwanted artifacts created by sharp corners, draft angles, and other imperfections due to many implementations of existing manufacturing.

FIG. 1 is a mechanical diagram of an existing fuel injection unit. Pipe 15 of the device carries the hydrogen to be input into the fuel cell via the injection assembly from inlet 20 to inlet 17, which is the inlet to the heat exchanger 19. A function of the heat exchanger 19 is to increase the temperature of the hydrogen flowing through one of the channels by exchanging heat between a first channel, which includes the hydrogen, and a second channel, which may include a hotter "coolant" or other substance from which heat may flow to the hydrogen or to which cold may flow to the coolant from the hydrogen in accordance with general thermodynamic principles. As the illustration shows, the typical heat exchanger 19 may be implemented as a plurality of stacked plates, maximized in area to thereby maximize an exposure area of the channels to each other. The heat exchanger 19 may be mounted to a frame of the vehicle using a bolt and an aperture 18a in the bracket.

The heat exchanger 19 is generally attached to a bracket 18 by means of a series of bolts. The purpose of the bracket 18 is to enable the fuel injection unit to be fixedly mounted to a frame (not shown) on some portion of the interior vehicle assembly. Heat exchanger 19 may also include one or more pressure sensors 12b mounted on heat exchanger 19 for sensing pressure magnitudes of fluids entering heat exchanger 19.

The hydrogen fuel is progressively heated by heat exchanger 19 as it flows from inlet 17 until it exits heat exchanger 19 and flows into a channel 16, which may be an elongated tube. The input and output of channel 16 may include respective connectors 16a and 16b (e.g., connected using bolts, nuts or other fixtures), which in turn may include additional pressure sensors. One example is pressure sensor 12a proximate the connector 16b. Hydrogen thereupon may flow into a fuel rail attenuation volume 14 (sometimes referred to as a "FRAV," acoustic attenuator volume, or attenuator volume). The FRAV in FIG. 1 is a complex assembly of components designed to reduce the acoustic noise created by the hydrogen flow and corresponding pressure differentials. As shown in FIG. 1, FRAV 14 is a discrete component from that of heat exchanger 19. While the outer portion of FRAV 14 is shown in the illustration, the interior of FRAV 14 includes an outer cylinder (e.g., bounded by component 14b), and an inner cylinder (obscured from view). The inner cylinder includes the heated hydrogen flowing from the heat exchanger from output 16a of channel 16. The circumference of connector 16a may correspond to the circumference of the inner cylinder of FRAV 14. The outer cylinder bounded by component 14b includes attenuating hydrogen (e.g., a portion of hydrogen used to dampen acoustic noise) positioned between the inner circumference of the inner cylinder and the outer circumference (component 14b) of FRAV 14.

Existing FRAVs typically include a subset of discrete components that are sealed and bolted together. In the example shown, FRAV 14 includes two aluminum components 14a and 14b. Presently, the aluminum components 14a and 14b are manufactured using forging, die casting, and/or machining techniques. After they are formed, aluminum components 14a and 14b are joined together and sealed. For example, during manufacturing of the aluminum components 14a and 14b, a ridge 27 may be formed. Half of the ridge 27 may be manufactured as part of the aluminum component 14a, and the remaining half of the ridge 27 may be manufactured as part of the aluminum component 14b. The respective portions of the ridge 27 are then aligned and secured together using bolts 28 extending through the ridge.

To further seal together the aluminum components 14a and 14b of the ridge 27, an O-ring is inserted between the ridge 27 to tighten the seal. The O-ring is squeezed thinly when the two aluminum components 14a and 14b of FRAV 14 are joined together; for this reason, the O-ring is obscured from view. In addition, as noted above, FRAV 14 includes an inner cylinder (obscured from view) through which the heated hydrogen gas from the heat exchanger 19 is routed. A second O-ring is inserted within FRAV 14 between aluminum components 14a and 14b, along with hardware similar to ridge 27. Thus FRAV 14 includes at least two O-rings, in addition to the plurality of bolts 28 for joining the respective portions of at least ridge 27 together. These areas, using bolts 28 and elastomeric materials (i.e., O-rings) are particularly susceptible to hydrogen leakage.

In addition, FRAV 14 includes two injectors 6 and 8. The injectors may be switched on or off in a manner that optimizes the flow of hydrogen through the inner cylinder of FRAV 14. The injectors 6 and 8 may be adjacent an input 10 which allow pressurized hydrogen to flow to the injectors 6 and 8, and to release into FRAV 14 when the injectors 6 and 8 are activated. FRAV 14 may also be proximate pressure sensor 12*a* for sensing the pressure within the interior of FRAV 14. In this example, the injectors 6 and are side feed injectors. The injectors 6 and 8 bridge the gap between the inner cylinder and the outer cylinder of FRAV 14. That is, the hydrogen is fed into FRAV 14 using injectors 6 and 8 via input 10. In turn, the injectors 6 and 8 control the pressure and velocity of the flow of hydrogen to the inner cylinder of FRAV 14. Thus, in addition to the hydrogen entering FRAV 14 from the heat exchanger 19, hydrogen is sourced from the injectors 6 and 8 as well. As the injectors 6 and 8 are selectively or periodically activated, FRAV 14 dampens the resulting sound.

Referring still to FIG. 1, FRAV 14 is connected to ejector assembly 13. While including various components, the ejector assembly 13 is characterized as the portion of the fuel injector unit from (and including) reference number 13 to (and including) the reference number 12. The ejector assembly 13 terminates at the stack anode inlet 12, where the latter is the location where the hydrogen is injected into the anode of the corresponding fuel cell. Ejector assembly 13 may include three injection molded components welded into a single assembly. Being a discrete device, ejector assembly 13 is connected to FRAV 14. In this example, the cylindrical portion of ejector assembly 13 is coupled to the aluminum component 14*a* using three bolts, two of which are represented by small segments 32 that protrude through connecting plate 31, and one of which is obscured from view, being on the opposite side of the assembly. During use of the fuel injection unit, the hydrogen from the inner cylinder of FRAV 14 is channeled through the pipe 33 of ejector assembly 13 and out of the stack anode inlet 12 into the anode portion of a corresponding fuel cell. Ejector assembly further includes pressure sensors 39*a* and 39*b* for sensing pressure as the hydrogen gas passes through the region of the pipe 33.

The example fuel injection unit described above is susceptible to hydrogen leakage in a number of regions. During manufacture, FRAV 14 is first partitioned into two discrete components, which are then connected using a combination of bolts and O-rings. As noted above, the FRAV 14 is subject to hydrogen leakage, due to the imperfections in the elastomeric O-rings and the overall imperfect nature of the connection. In addition, ejector assembly 13 is separately connected to FRAV using a plurality of bolts. Hydrogen may therefore leak through the imperfect connection between ejector assembly 13 and FRAV 14. The injection unit as shown from inlet 20 through the pipe 15 and ultimately to stack anode inlet 12 is not just susceptible to excessive hydrogen leakage, but its irregular and larger shape needs to be taken into account in the overall design of the body of the vehicle. Each of the pressure sensors, including pressure sensor 12*a* on FRAV 14 and pressure sensors 39*a* and 39*b* on the pipe 33 of the ejector assembly, are subject to additional hydrogen leakage.

Accordingly, in an aspect of the disclosure, additive manufacturing techniques are used to (1) reintegrate the fuel cell injection unit into a single, uniform structure, and to (2)

reduce and streamline the shape and size of the structure, thereby making the power system of the vehicle more compact and able to produce more power in a smaller volume. As discussed further below, a streamlined internal shape of the internal volume of the FRAV may also enable the integrated fuel injection unit to have substantial performance benefits such as, among other benefits, to produce an efficient venturi tube in the FRAV lacking an appreciable draft angle.

FIG. 2 is a mechanical diagram of an additively manufactured, integrated fuel cell injection unit 200 in accordance with an aspect of the disclosure. Relative to FIG. 1 and including a number of additional distinctions to be addressed herein, integrated fuel cell injection unit 200 includes an efficient version of the features residing in FIG. 1 between inlet 20 and the stack anode inlet 12.

The structure of FIG. 2 may be additively manufactured using one of a variety of suitable 3-D printers. In the initial stages of an additive manufacturing process, the designer generally creates a detailed CAD file disclosing a visual and numerical representation of the features of the structure at issue. In one example a powder bed fusion (PBF) 3-D printer may be used. The CAD drawing is thereupon formatted for use by the 3-D printer. In one step, for example, software compatible with the 3-D printer may be used to analyze the CAD file(s) and partition the file into a number of slices. The slices physically and visually represent cross-sectional segments of the structure to be printed. Thus, the slices include the needed data to reproduce a physical version of the integrated hydrogen fuel injection unit in the 3-D printer.

In this embodiment, one slice is produced at a time. A PDF printer in this embodiment may include a substrate. During a first print cycle, the printer may use a depositor to deposit a first layer of powder into the powder bed. In alternative print designs, a roller may instead be used to spread a predetermined amount of powder from a first source of powder to the substrate. Depending on the printer and the design objectives, the powder may represent a particular type of metal or alloy. It will be appreciated, however, that different types of printers are capable of printing different materials. Referring back to the first print cycle, after depositing the first layer, a laser beam source or electron beam source may deflect the laser or electron beam via a movable mirror to enable the laser or electron beam source to selectively melt, or weld, portions of the deposited powder slice as defined by the data in the slice. The remaining, non-melted portions of the deposited powder may later be removed, e.g., when the final structure is removed from the printer.

After the first slice is deposited and selectively melted, the 3-D printer may deposit the next slice and selectively melt regions in that slice. This process may proceed until the so-called build piece is completed. The residual powder that was unused may be removed, and the build piece may be post-processed for cleaning purposes. Thereafter, the structure may be integrated with other structures and ultimately connected to the relevant fuel cell(s) in the portion of the vehicle.

Referring still to FIG. 2, integrated fuel cell injection unit 200 includes stack anode inlet 212, which provides an aperture for introducing heated hydrogen with the appropriate pressure and velocity into the anode portion of an associated fuel cell or fuel cell stack (not shown). Integrated fuel cell injection unit 200 also includes flange 202, which in this example includes two apertures for coupling the integrated fuel cell injection unit 200 to its relevant position in the vehicle. Stack anode inlet 212 and flange 202 are positioned at a top end 221 of integrated fuel cell injection unit 200. (The top end 221 for purposes of this disclosure is also referred to as the second end.)

As shown, integrated fuel cell injection unit 200 further includes a generally cylinder-type body 214. The upper portion of the body 214 adjacent the second end adopts a generally conical portion 222 of body 214, although other shapes are possible. As more clearly seen with reference to the cross-sectional view of integrated fuel cell injection unit 200 in FIG. 3, the interior of at least a part of the conical portion 222 of body 214 includes a volume between a surface of an interior heat exchanger and the top or second end of integrated fuel cell injection unit 200. In this embodiment, the conical portion 222 further includes an inlet 204. The inlet 204 is coupled to a channel for receiving fresh hydrogen from a hydrogen tank or other source. In some embodiments, the inlet 204 may additionally or alternatively be used to receive unused hydrogen that was previously injected into the corresponding fuel cell. In this embodiment, unused hydrogen that does not interact or explode in the fuel cell may be rerouted back through the channel and into the inlet 214 of the conical portion 222 of body 214. To help ensure efficiency and performance of a fuel cell or a fuel cell stack, integrated fuel cell injection unit 200 is configured to eject into the fuel cell more hydrogen than is needed for the ensuing chemical reaction. As a result, unused hydrogen may be pumped back to the stack anode inlet 212 using a jet pump or a recirculation blower. In a manner explained further with reference to FIG. 3, residual hydrogen not used in a previous reaction may be recycled using a dedicated recycle path inlet 220.

With continued reference to FIG. 2, body 214 includes a bottom end 224, also referred to herein as a first end. In addition, body 214 includes two apertures 206 and 208. Aperture 206 may be an inlet, and the other aperture 208 is an outlet. As described below, apertures 206 and 208 may be used to pass fresh and used coolant, respectively, through a second channel of a two-channel heat exchanger. The temperature of the coolant is higher than that of the hydrogen when the coolant enters integrated fuel cell injection unit 200. Body 214 also includes a partial view of the recycle path inlet 220 into the body 214. Residual hydrogen from the surrounding area that may otherwise result in wasted emissions may be drawn into the recycle path inlet 220 and reused in the corresponding fuel cell.

In the integrated fuel cell injection unit 200, the interior of body 214 may include a volume (e.g., FIG. 3) that acts as the attenuation volume. That is, as will be seen, an inner cylinder within body 214 may include a channel of traveling heated hydrogen for injection into the fuel cell, while an exterior volume of body 214 may operate to dampen sound, much like the FRAV 14 of FIG. 1.

FIG. 3 is a cross section of the fuel injection unit of FIG. 2 taken along a vertical axis through integrated fuel cell injection unit 200, in accordance with an aspect of the disclosure. The bottom (first) end 324 of integrated fuel cell injection unit 200 includes an aperture 356 incorporated into the body 314 of integrated fuel cell injection unit 200. While more than one such aperture may be present, in this embodiment, one aperture 356 is shown. Vertically aligned with the aperture 356 within the body 314 is a nozzle receptacle 360. The nozzle receptacle 360 may be mounted to an interior surface of the body 314. The function of the aperture 356 and the nozzle receptacle 360 is to enable the manufacturer to insert a selectively activating hydrogen injector 391 vertically within the body 314 proximate the bottom (first) end 324. The injector 391 is analogous in function to one of the side feed injectors 6 and 8 shown in FIG. 1. Injector 391 is used to control the flow of the heated hydrogen in volume 340, in addition to the hydrogen emitted from the ejector. Unlike in FIG. 1, the injector may be vertically installed in FIG. 3 within aperture 356 such that the end of the injector may be securely coupled with the nozzle receptacle 360.

Pressure sensors may be integrated within nozzle receptacle 360 or the injector itself, or both, as well as other regions within body 314 of integrated fuel cell injection unit 200. In existing techniques, pressure sensors are discrete elements that may result in leakage. In the embodiment of FIG. 3, however, one or more pressure sensors may be integrated within the additively manufactured body 314 to avoid leakage. From a manufacturing perspective, during 3-D printing, at a designated point the print may be temporarily suspended to add a pressure sensor, after which printing may resume. In other examples, the 3-D printer itself may be used to build the pressure sensor, or portions thereof. In either case, the pressure sensors may be integrated within body 314, thereby effectively eliminating leakage concerns.

The injector may be installed at some strategic point during the additive manufacturing process, or it may be inserted after the 3-D print job is complete. The nozzle receptacle 360 is designed not just to stabilize and secure the inserted injector, but also to include an output that channels the hydrogen emitted from the injector through an appropriate path 361. The path 361 in turn allows the injector output to effectively align with an input 344a the ejector nozzle 344. While shown in cross-section here, the ejector nozzle 344 may be a cylindrical or tubular nozzle that receives hydrogen from the injector output (via channel 361) as well as other sources of hydrogen described herein and ejects the hydrogen into an ejector tube 390. In some embodiments, ejector tube 390 is a venturi tube. The changes in pressure resulting from selective activation of the injector cause the ejector nozzle 344 to output hydrogen into the ejector tube 390. This mechanism of action includes pressure differentials that occur in a gap 342 as a result of the selective injections of hydrogen from the injector as described herein. The gap 342 is coupled through the body 314 externally via recycle path inlet 320 (shown in cross section). Stated differently, the gap 342 is a recycle path for residual hydrogen and includes the wide gaping cross-sectional opening (i.e., recycle path inlet 320) that curves upward to the ejector tube 390. The gap enables residual hydrogen external to integrated fuel cell injection unit 200 to flow through inlet 320 into the body 314 for use in the fuel injection process. Similar to unused hydrogen entering inlet 304, the recycle path may be used to recycle residual hydrogen that had been injected into the fuel cell but was not used. This residual hydrogen may originate from the exit of the fuel cell stack in use.

The ejector tube 390 extends at least partly longitudinally up the body 314 to the stack anode inlet 312 at the top end 321, where the hydrogen is supplied to an anode of the fuel cell. When an interaction occurs in the fuel cell, the unused hydrogen may be rerouted through a channel (not shown) to input 304. Thus input 304 receives unused hydrogen from the fuel cell (or fuel cell stack) receiving hydrogen from stack anode inlet 312. The hydrogen that is not used in the interaction therefore enters the conical portion 322 of body 314 via input 304. The unused hydrogen may enter the conical portion 322 as a liquid initially, such as when a significant amount of heat is released during the latest fuel cell reaction. In various embodiments, input 304 may alternatively or additionally be used to feed hydrogen into integrated fuel cell injection unit 200 from another source, such as a tank.

The unused hydrogen from this reaction, after passing through inlet 304, initially enters a volume region 338 located near the top surface 321 and around the ejector tube (e.g., venturi tube) 390. Because the unused hydrogen at this stage is at a lower temperature than is needed for injection into the fuel cell, the unused hydrogen should be reheated in a relatively quick and efficient manner. Accordingly, in an aspect of the disclosure, a heat exchanger 336 is positioned within the body 314 of integrated fuel cell injection unit 200. The heat exchanger 336 constitutes the set of wavy lines on either side of the ejector tube 390 and the blank areas between them. While FIG. 3 is a cross-sectional view, the heat exchanger 336 may in various embodiments extend around the entire circumference of ejector tube 390.

The strategic placement of heat exchanger 336 within body 314 simplifies the design significantly and reduces the needed space of the heat exchanger by a substantial amount. In another aspect of the disclosure, the top surface 350 of the heat exchanger 336 is formed around the body 314 of integrated fuel cell injection unit 200 in the shape of a gradient. For example, the surface 350 at the top of the heat exchanger 336 gradually increases in height. Like a cone (whether or not symmetric), an opposite side of the heat exchanger surface 350 gradually decreases in height. The distributed gradient of the heat exchanger 336 as defined by its conical-like surface 350 provides substantial advantages. For example, the gradient of surface 350 allows the hydrogen input from inlet 304 to spread evenly over a much larger area. In addition, rather than the stacked-plate heat exchanger of FIG. 1, the heat exchanger 336 uses a gyroid pattern or similar pattern using a triply periodic minimal surface (TPMS) lattice of unit cells. As a result, hydrogen may be heated to requisite temperatures in a much faster and more efficient manner. For clarity, it should be noted that while a cross-sectional view is shown, the gradient has a surface area that may extend around a perimeter of the gap 342/ejector nozzle 344/ejector tube 390 assembly (collectively, the "ejector assembly 388") on the inside of body 314 and bounded by a circumference of the body 314 on the outside of body 314.

To understand the flow of fluids more clearly in the embodiment of the two-channel heat exchanger 336, a non-cross-sectional view of the heat exchanger is subsequently provided in FIG. 4. In general, with reference to FIG. 3, the example heat-exchanger 336 is a two-channel heat-exchanger. In the first channel 336a (in which one of multiple segments is referenced), hydrogen is able to flow freely. For clarity, reference numeral 332 also shows a first channel to the right of the ejector tube 390. The heat exchanger 336 is optimized to facilitate hydrogen flow through the first channel 336a, starting from surface 350 of heat exchanger 336, then downward throughout the various branches of the first channel 336a to a second conical gradient 350 proximate the bottom end 324 of the body 314 of integrated fuel cell injection unit 200. While unclear from FIG. 3, the pathways similar to 336a are arranged in topologically optimized three-dimensional shapes that are configured to facilitate flow of the hydrogen through the heat exchanger 336 and into the volume 340 at the bottom ("first") end of body 314.

Similarly, adjacent to the first channel 336a, a second channel 336b is present. The second channel 336b is shown principally as areas of blank space within the heat exchanger 336. The second channel 336b carries the "coolant" material from which the hydrogen absorbs heat. The second channel 336b is designed such that the molecules of coolant are unable to leave the second channel. Like the first channel 336a, the second channel 336b is topically optimized in three dimensions. In various embodiments, the second channel 336b is often routed directly adjacent to the first channel 336a to facilitate the exchange of heat from the hydrogen in the first channel 336a and the coolant in the second channel 336b.

Because the coolant entering into the heat exchanger through an input 206 is higher in temperature than the hydrogen passing through the heat exchanger, the coolant may be used to heat the hydrogen. The hydrogen absorbs heat from the coolant until the former becomes vaporized by exchanging heat with the coolant. A heat-conductive metal or alloy may be used to define the respective channels 336a-b and to physically separate the two materials. For example, fresh coolant may be ejected into inlets 362 closer to the top end 321 of integrated fuel cell injection unit 200 in this cross-sectional view, and cold (used) coolant may exit the body 314 via certain outlets 372 near the first end 324. In various embodiments, the inlets 362 of FIG. 3 may correspond to input 206 (FIG. 2), and the outlets 372 of FIG. 3 may correspond to output 208 (FIG. 2).

After the heated hydrogen reaches the bottom of heat exchanger 336, the hydrogen passes through conical wall 352 and populates volume 340 below the heat exchanger 336.

When the injector is activated, hydrogen is emitted from an external source (e.g., a tank). One consequence of this emission is that the unused hydrogen in volume 340 heated by the heat exchanger 336 is forced upward through path 361 that aligns the injector with the ejector nozzle 344, through the input 344a of ejector nozzle 344, up through the ejector tube 390, and into the fuel cell via stack anode inlet 312 at the top end 321 of the integrated fuel cell injection unit 200. In addition, the activation of the injector produces hydrogen having a selected pressure and velocity. These characteristics of the emitted hydrogen create a low-pressure region in gap 342. This mechanism, in turn, allows residual hydrogen external to body 314 of integrated fuel cell injection unit 200 to enter recycle path inlet 320 into the gap. The residual hydrogen in the gap may enter ejector tube 390 along with the emitted hydrogen from the injector and the unused hydrogen that passed through the heat exchanger. The hydrogen may then enter the fuel cell via stack anode inlet 312. In short, integrated fuel cell injection unit 200 may use the hydrogen activated from the injector to create the low pressure zone in gap 342 and thereby pull the residual hydrogen back into the stack anode inlet.

Another significant benefit of the subject matter described is that the ejector assembly 13 in FIG. 1 is now integrated into the body 314 of integrated fuel cell injection unit 200. The ejector assembly may include, in this example, ejector tube 390 and stack anode inlet 312. Accordingly, the connecting plate 31 and bolts represented by cylindrical-like segments 32 are no longer needed. As such, this region of existing hydrogen leakage is effectively eliminated.

In a related aspect of the disclosure, the heat exchanger 336 is integrated within the attenuation volume (FRAV volume). The activation of the injector(s) causes a reduction in fluid pressure as the hydrogen flows. When the activated injector closes, the body 314 and gap 342 leading to recycle path inlet 320 may be used to dampen the sound. In the example shown, the volume inside the body 314 to the boundary created by ejector assembly 388 constitutes the FRAV volume. The inclusion of heat exchanger 336 within the FRAV volume saves a potentially significant amount of space and reduces the overall size of integrated fuel cell injection unit 200. The ejector nozzle 344 and ejector tube 390 correspond to the inner cylinder of the FRAV 14 in FIG. 1.

With continued reference to FIG. 3, the high pressure, high velocity hydrogen gas from the injector travels through the nozzle 344 and the ejector tube 390, the latter of which may be a venturi tube. In some cases, inlet 304 receives fresh hydrogen from one or more fuel sources, such as hydrogen tanks. The hydrogen that just went through the inlet 304, volume 338, heat exchanger 336, and volume 340 guided into the ejector tube 390 via the ejector nozzle 344, as described herein. In addition to this freshly sourced hydrogen, the identified residual hydrogen that occupies an area near integrated fuel cell injection unit 200 is generally a byproduct of earlier interactions or combustions in the fuel cell stack that include hydrogen, certain other gaseous agents, and water. The geometry of the ejector tube 390 may create the low pressure zone in the gap 342 to enable the residual hydrogen to flow into the gap 342. Thy hydrogen in gap 342 is then blasted up through the ejector tube 390. The overall pressure control system is such that when the pressure of hydrogen flow towards the stack anode inlet 312 drops below a threshold, the injector 391 may be activated such that hydrogen fuel is injected. This injection of hydrogen raises the pressure in the system, after which the injector 391 is closed and the flow of hydrogen from injector 391 stops.

Depending on the power demand of the fuel cell to which integrated fuel cell injection unit 200 is coupled, the cyclical injections from injector 391 may occur with greater or lower frequencies. The venturi tube acts like a jet pump or vacuum pump. In some embodiments, the anode stack inlet may reach a point where it is at a higher pressure than the injected contents from integrated fuel cell injection unit 200. Naturally, the pressure differential would make the hydrogen flow backwards. This action may be avoided by using a venturi tube as the ejector tube 390. For example, when hydrogen is injected into the fuel cell, a low pressure region is created as described herein. The gap 342 may overcome the pressure differential be receiving residual or excess hydrogen from the recycle path inlet 320.

A venturi tube increases the velocity of the hydrogen flowing within it by restricting it in a tube with a cone, such as the cone 396 near the base of venturi tube 390 in FIG. 3. The remaining portion of the venturi tube as it extends upward toward stack anode inlet 312 is restricted to a cylindrical size. As a result of the geometrical restriction, the hydrogen flow has to accelerate, which lowers its pressure and creates a partial vacuum at the gap 342. In the venturi tube, the pressure of the hydrogen increases as it exits the constriction. Integrated fuel cell injection unit 200 in FIG. 3 effectively takes advantage of the velocity of the hydrogen and the sonic flow out of the ejector nozzle, such that the geometrical relationship between the venturi tube and the ejector nozzle 344 maintains adequate pressures that prevent a backward flow of hydrogen.

By contrast, using existing techniques, the venturi tube cannot be ideal because it is composed of injected molded plastic. This in turn creates an unwanted draft angle, which compromises the effectiveness of the venturi tube. In the present embodiments, however, injection molding is not needed, and the venturi tube may be additively manufactured without a compromising draft angle.

Another benefit of the disclosure is that the pressure sensors 39a and 39b positioned on pipe 33 of the ejector assembly 13 are eliminated. Instead, pressure sensors may be integrated at strategic points within the body 314 of the FRAV during the additive manufacturing process. Hydrogen leakage attributable to sensors 39a and 39b may therefore be substantially eliminated.

Another shortcoming with existing fuel injection units involves the fact that FRAV or acoustic noise attenuator typically needs to be forged to close down the molecular structure of the aluminum to prevent excessive hydrogen from diffusing through the aluminum. The disadvantages associated with a tedious forging process may be eliminated using additive manufacturing, and the integration of the various fuel injection components within the body substantially minimizes hydrogen diffusion.

FIG. 4 is a geometrical representation of a two-channel heat exchanger 436 in accordance with an aspect of the disclosure. The heat exchanger 436 is consistent with the heat exchanger as represented in FIGS. 2 and 3. An upper portion 450 of the semi-cylindrical structure shows the gradient used to increase the surface area of the incident hydrogen gas entering the heat exchanger from the volume 338 (FIG. 3). The globular looking elements are part of the first channel through which hydrogen is configured to flow from the upper gradient 450 and downward. Thus, first channel 436 carries hydrogen. A TPMS lattice of unit cells may be used to form the channels and confine fluid flow. For example, the metallic portion 463 of the first channel 436a may be used to confine the flow of hydrogen within the first channel, which may be distributed throughout the heat exchanger 436. The hydrogen itself includes the substance between the channels, such as the hydrogen 465.

A second channel carrying the coolant material is represented by each of the blank spaces between the first channel 436a, including channels 436b. Because a substantial amount of hot coolant is needed to heat the hydrogen, the second channels are larger. It should also be noted that a simple exterior representation of the heat exchanger 436 does not appear to show how the hydrogen may flow from the upper portion 450 to the lower portion 424. It should be borne in mind, however, that the interior portion of the heat exchanger 436 may connect the various branches of the first channel together. Further, as noted, the TPMS lattice may be designed to topologically optimize the flow of hydrogen from the upper portion 450 to the lower portion 424. For example, the two channels 436a and 436b may be aligned such that the hydrogen is exposed to a maximum amount of coolant (albeit separated by the channels) but that flows from the upper portion 450 to the lower portion 424 fast enough to provide a sufficient amount of hydrogen fuel to the fuel cell stack.

The heat exchanger 436 may also have dedicated locations for injecting coolant, such as an input 462in to the second channel, and for retrieving used (cold) coolant, such as at output 462out. In this manner, the heat exchanger 436, using channel 426in and 462out, may be continuously supplied with a sufficient volume of heated coolant.

The lower portion 424 may correspond to an edge of the bottom end 324 (FIG. 3). It should be noted that in some embodiments, such as in FIG. 3, the gradient is an upward cone. Thus, just the edges of bottom surface 424 are visible, making the object appear flat at the bottom.

While the heat exchanger is generally included with other components in a practical integrated fuel cell injection unit 200, just the heat exchanger is shown in FIG. 4 to avoid unduly obscuring concepts of the disclosure. Also, while heat exchanger 436 adopts a semicylindrical shape with gradients at the respective upper and lower portions 450 and

424, the principles of the disclosure are not limited to this shape. A wide variety of geometries may be adopted and integrated within the acoustic volume attenuator. In some examples, additional channels may be used. Different materials and different architectures may also be adopted to form the channels.

FIG. 5 is a conceptual diagram of a powder bed fusion (PDF) three-dimensional (3-D) printer 500 for additively manufacturing metallic products such as the device of FIG. 2. While a powder bed fusion (PBF) printer is described for illustrative purposes, a number of different types of 3-D printers may be used to form integrated fuel cell injection unit 200 without departing from the principles of the disclosure. In addition, 3-D printers may be complex devices and may be controlled using integrated electronics, a separate computer, or some combination thereof, this disclosure focuses on the basic elements.

As noted above, after a computer-aided design (CAD) file of integrated fuel cell injection unit 200 is produced, software specific to the 3-D printer at issue may be executed to geometrically partition the structure and its details into a large number of individual slices. Each slice corresponds to a powder layer. The powder may be one of a variety of metals or alloys thereof, such as, but not limited to, aluminum or an aluminum alloy. After the layers are deposited and the relevant cross-sectional regions of the structure are deposited, integrated fuel cell injection unit 200 may be post-processed and completed.

Referring to the elements of FIG. 5, hopper 502 may be a large tank for holding the powder to be used during the print. An output device such as channel 504 may retrieve selected amounts of powder from the tank and send it to the depositor 510. The depositor 510 is a moving device and for at least this reason, the use of the channel 504 to retrieve the powder is a simplification. In actuality, the depositor may rest on or hover above platform 523 when a scanning process is ongoing. The depositor may include a smaller tank in some embodiments for storing enough powder to use for a few cycles. In some embodiments, the powder is deposited from a tank using a vertical channel when the depositor 510 is at rest.

After the controller governing the print process receives the sliced code and the hopper supplies the depositor with powder, the depositor may deposit a first layer onto substrate 518. At the beginning of the print, the substrate 518 may be approximately level to platform 523. The depositor 510 thereupon glides across the surface of the substrate and deposits a first layer representing the first slice, or the bottom, of integrated fuel cell injection unit 200. The depositor may then return to the platform 523 to avoid being an obstacle to the next process, which is the scanning cycle. In the scanning cycle, under control of code and/or electronic hardware that may use a Cartesian coordinate system as a reference to implement the scanning cycle. A laser beam source 506 (which in other printers may instead include an electron beam source) shines a laser beam at a mirror 508 or other reflective, movable lens. The laser light 507 is diverted to strike, and effectively melt, selected areas of the powder that correspond to the first slice. Areas of the powder that do not represent cross-sectional regions of the structure are not scanned. The scanned areas, after being struck by the laser, melt and then quickly fuse together to form a cross-section of the first slice.

Before the depositor deposits another layer corresponding to the second slice, the controller may move the substrate slightly downward using a piston 520. After each deposit-and-scan cycle, the substrate is moved downward by small but equivalent amounts. This movement enables the object being printed, also referred to as the build piece 516, to become larger as more slices are used. This movement also creates a powder reservoir 512 that is included in a region between the top of the powder bed 512 and a (sliced for illustrative purposes) side of 3-D printer wall 514. In some cases, the controller and extensive electronic circuitry may also be integrated into the 3-D printer 500, below the platform and within the body of the 3-D printer as defined by wall 514, in an inner rectangular area. In other embodiments, the platform 523 may instead include a second powder bed that uses a roller to uniformly roll each layer of powder onto the powder bed 512. However, the embodiment of FIG. 5 focuses on the depositor embodiment.

After excess powder is retrieved from the hopper 502 via channel 504, the depositor 510 deposits another layer and moves back to platform 523. The controller then uses the position data in the second slice to scan with the laser beam 507 the areas of powder that will become part of the build piece 516. The mirror 508 is precisely controlled by a controller, because it is responsible for directing the laser beam onto the correct position on the powder layer.

This process repeats, slice-by-slice and equivalently, layer-by-layer, until the build piece 516 (here, integrated fuel cell injection unit 200) is complete. In some embodiments, the print process may be suspended. This suspension may be desirable, for example, if the manufacturer wishes to insert a custom injector into integrated fuel cell injection unit 200, or a custom pressure sensor, along with accompanying electronics (e.g., semiconductors, low resistance metallic traces, etc.). In some embodiments, the print is suspended multiple times to enable insertion of various components within the integrated fuel cell injection unit 200, including non-metals, or other materials. In some printer designs, multiple print materials may be used. Further in some 3-D printers, some other substance, such as a gel or liquid, may be used in lieu of metal powder.

As shown in FIG. 5, the 3-D printing (also referred to as additive manufacturing) process is highly beneficial in that the printer 500 may integrate the different features of integrated fuel cell injection unit 200 into a single body. The 3-D printer, for example, is capable of building TPMS lattices, nozzles, tubes of different selected geometries, and many other structures. The 3-D printer is highly geometrically diverse. In this case, the 3-D printer obviates the need for many, if not most, subtractive manufacturing techniques, including for example machining, molding, extruding, forging, die-casting, etc. These techniques are not just expensive, but also inflexible. A mold, for example, is capable of making a single shape. By contrast, the geometrical shapes using a 3-D printer 500 are limited mainly by the manufacturer's imagination.

FIG. 6 is an exemplary flow diagram 600 of a method for additively manufacturing an integrated fuel-injection unit in accordance with an aspect of the disclosure. The steps of FIG. 6 may be formed by a variety of 3-D printers, including the powder bed fusion (PBF) 3-D printer 500 of FIG. 5 and the many PBF varieties. To avoid obscuring the concepts of the disclosure, the steps are in no particular order and are directed to the additive manufacturing of various components. Thus FIG. 6 does not include the individual processes of 3-D printers, at least because such printers may differ dramatically in operation but may be suitable for use in additively manufacturing integrated fuel cell injection unit 200.

Referring to logic block 602, the 3-D printer may form a body with a cylindrical shape (or another suitable shape) to define an acoustic attenuation volume. This volume may be formed by the walls of body 314 (FIG. 3), and other components for dampening sound. Referring to logic block 604, the 3-D printer may also progressively print within the body of the build piece 516 (such as on a slice-by-slice basis as described above with respect to FIG. 5), a venturi tube. The venturi tube may be printed such that it has a directional component that is longitudinal along the body so that the venturi tube may form a stack anode inlet at its end.

Referring to logic block 606, the 3-D printer may print an ejector nozzle having an output aligned with the venturi tube for selectively injecting hydrogen into the venturi tube. It is noteworthy that in powder bed fusion processes, some or each of these components may be formed, at least in part, simultaneously, due to the layer-by-layer nature of the print and the cross-sectional laser scanning. For at least this reason, the print steps are not in a particular temporal order.

Referring to logic block 608, the 3-D printer may enclose the ejector nozzle within a gap that extends to an aperture in a surface of the body to recover unused hydrogen. In the context of a PDF 3-D printer 500, one manner of accomplishing this step is to leave the relevant geometric portions of the CAD file corresponding to the gap blank, so that when sliced, the regions corresponding to the gap are not scanned with the laser beam. In this manner, the final build piece will include a gap full of loose powder that may be removed using a variety of techniques.

Referring to logic block 610, the 3-D printer may integrate a heat exchanger into the acoustic attenuation volume. Here again, this procedure may entail producing a CAD representation of the heat exchanger within the body. The 3-D printer may print the lattice and body simultaneously in some regions, incorporating the lattice of unit cells using precision laser or electron beam scanning.

Referring to logic block 612, the 3-D printer may form an aperture and a receptacle for mounting a custom injector to control hydrogen flow. In some embodiments, the receptable and/or the injector, may be customized, in whole or in part. Thus, for example, the receptacle or the injector may be a custom item or a commercial-off-the-shelf (COTS) item instead of being additively manufactured. In one example, if the receptacle is additively manufactured but the injector is custom, the 3-D printer may form the integrated fuel cell injection unit 200 with one or more gaps at the bottom to house respective injectors. After removing the stray powder from the finished build piece and performing post-processing (polishing, application of fluids, etc.), the manufacturer may insert a custom injector through the aperture at the bottom of the build piece 516 and ensure that the injector is securely seated in the receptacle. In some cases, glues or adhesives may be used to ensure that a custom injector is properly coupled to the receptacle and to the aperture. In other cases, the injector is additively manufactured, or partially additively manufactured. It may be beneficial to suspend the print just after the aperture is formed so that non-print measures to seal or secure the injector are easily performed before printing resumes to finalize integrated fuel cell injection unit 200.

Another benefit of the principles disclosed herein is that unlike traditional manufacturing techniques in which sharp edges and awkward angles are often difficult, if not impossible to avoid, the resolution of modern 3-D printers is extremely high and the geometrical resolution of the print jobs is so precise that a wide variety of shapes may be formed. Sharp edges and draft angles that exist in present fuel injection units may be eliminated using many of the existing additive manufacturing techniques, including techniques disclosed herein.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. An additively manufactured hydrogen fuel cell injection unit, comprising:
   a body comprising a noise attenuation volume integrated therein, a first end of the body comprising an aperture for mounting an injector;
   an ejector assembly including an ejector tube and a stack anode inlet positioned at a second end of the body, the stack anode inlet configured to inject hydrogen into a fuel cell;
   a heat exchanger integrated within the noise attenuation volume and comprising a triply periodic minimal surface (TPMS) lattice of unit cells arranged therein, the TPMS lattice being configured to heat hydrogen flowing therethrough, each end surface of the heat exchanger separated from the first and second ends of the body by a respective volume; and
   an ejector nozzle coupled to an interior of the body and aligned with the injector near the first end of the body, the ejector nozzle surrounded by a gap, the gap leading to a recycle path inlet of the body for recapturing residual hydrogen proximate the recycle path inlet,
   wherein the ejector tube protrudes through the heat exchanger and is aligned with the ejector nozzle such that the ejector tube passes hydrogen through the stack anode inlet.

2. The additively manufactured hydrogen fuel cell injection unit of claim 1, wherein the hydrogen that passes to the fuel cell from the stack anode inlet includes (1) pressurized hydrogen sourced from the injector, (2) the residual hydrogen proximate the recycle path inlet, and (3) the hydrogen exiting the heat exchanger.

3. The additively manufactured hydrogen fuel cell injection unit of claim 1, wherein:
   the second end of the body comprises an inlet coupled to a hydrogen source;
   the volume between a first end surface of the heat exchanger and the first end of the body is a first volume;
   the volume between a second end surface of the heat exchanger and the second end of the body is a second volume; and
   the second end surface of the heat exchanger is shaped in a geometrical gradient configured to enable the hydrogen received from the inlet at the second end of the body to distribute evenly in the second volume when entering and passing through the heat exchanger to enable a uniform heat increase of the hydrogen.

4. The additively manufactured hydrogen fuel cell injection unit of claim 1, wherein:
   a first end surface of the heat exchanger and the first end of the body define a first volume into which heated hydrogen exiting the heat exchanger flows; and
   the first end surface of the heat exchanger is shaped to form a gradient for a more even distribution of the heated hydrogen as the heated hydrogen exits the heat exchanger into the first volume.

5. The additively manufactured hydrogen fuel cell injection of claim 4, wherein the gradient is shaped at least partly conical.

6. The additively manufactured hydrogen fuel cell injection unit of claim 1, wherein the TPMS lattice comprises a plurality of unit cells forming two channels, wherein a first channel passes hydrogen through the heat exchanger and a second channel passes a fluid to heat the hydrogen.

7. The additively manufactured hydrogen fuel cell injection unit of claim 6, wherein a side of the body includes two apertures for passing the fluid through the second channel of the heat exchanger.

8. The additively manufactured hydrogen fuel cell injection unit of claim 1, wherein the injector is configured to selectively activate to controllably pass hydrogen flowing from a volume proximate the first end of the body through the ejector nozzle and the ejector tube for emission into the fuel cell.

9. The additively manufactured hydrogen fuel cell injection unit of claim 1, wherein the ejector tube comprises a venturi tube, the venturi tube and the injector being configured to create a low pressure in the gap to pull the residual hydrogen into the gap through a recycle path inlet and through the ejector tube into the fuel cell via the stack anode inlet.

10. An additively manufactured fuel cell injection unit, comprising:
   a body having a noise attenuation volume therein; a first end of the body including an aperture for mounting a hydrogen injector;
   an ejector assembly including an ejector tube coupled to a stack anode inlet, the stack anode inlet positioned at a second end of the body for injecting hydrogen into a fuel cell;
   a heat exchanger comprising a lattice of unit cells integrated within the noise attenuation volume, the lattice being configured to heat hydrogen flowing therethrough, each end surface of the heat exchanger separated from the first and second ends of the body by a respective volume, a surface of the heat exchanger being adjacent each respective volume including a gradient;
   an ejector nozzle coupled to an output of the injector at the first end of the body, the ejector nozzle surrounded by a gap, the gap leading to a recycle path inlet of the body for recapturing excess hydrogen; and
   an ejector tube protruding through the heat exchanger and aligned with the ejector nozzle such that the ejector tube is configured to pass hydrogen via the stack anode inlet to the fuel cell.

11. The additively manufactured hydrogen fuel cell injection unit of claim 10, wherein one or both of the surfaces of the heat exchanger adjacent the respective volumes are at least partly conical in shape.

12. The additively manufactured hydrogen fuel cell injection unit of claim 10, wherein the injector is selectively activated to inject hydrogen from a source into the ejector nozzle to eject hydrogen from the stack anode inlet into the fuel cell via the ejector tube and to create a low pressure region in the gap for recapturing the excess hydrogen.

13. The additively manufactured hydrogen fuel cell injection unit of claim 12, wherein the injector is further configured to guide the heated hydrogen exiting the heat exchanger into the volume proximate the first end into the ejector nozzle and thereafter into the ejector tube.

14. The additively manufactured hydrogen fuel cell injection unit of claim 12, further comprising a plurality of pressure sensors co-printed with the ejector assembly, wherein the injector is cyclically activated to inject the hydrogen when the pressure drops below a threshold.

15. The additively manufactured hydrogen fuel cell injection unit of claim 10, wherein the body comprises an additively manufactured (AM) body, and wherein the AM body and integrated noise attenuation volume and heat exchanger are formed as a single, integral unit to eliminate use of elastomeric seals.

16. The additively manufactured hydrogen fuel cell injection unit of claim 10, wherein elements of the body are designed to avoid sharp angles and abruptly changing edges and to instead form curved portions.

17. The additively manufactured hydrogen fuel cell injection unit of claim 10, wherein the ejector tube includes a venturi tube formed using additive manufacturing without a draft angle.

18. A method for additively manufacturing a fuel injector unit, comprising:
   forming a body having at least a partly cylindrical shape and defining an acoustic attenuation volume therein;
   printing a venturi tube extending longitudinally along at least a part of the body from a first end to a second end, a stack anode inlet at the second end to inject hydrogen into a fuel cell;
   printing an ejector nozzle aligned with the venturi tube at the first end for selectively injecting hydrogen into the venturi tube;
   enclosing the ejector nozzle within a gap that extends to an aperture in a surface of the body, the gap used for recovering unused hydrogen for emission via the ejector nozzle and the venturi tube into the stack anode inlet;
   integrating a heat exchanger into the acoustic attenuation volume, the heat exchanger comprising a lattice of unit cells arranged between the venturi tube and a perimeter of the body, such that a first surface of the heat exchanger adjacent the first end includes a gradient bounding a first volume at the first end and a second surface of the heat exchanger adjacent the second end includes a gradient bounding a second volume with the second end, wherein hydrogen entering an inlet aperture in the second surface flows through the heat exchanger from the second volume to the first volume; and
   forming an aperture in the first end for mounting an injector, the injector being configured to selectively emit hydrogen from the first volume and from an injector through the ejector nozzle and into the venturi tube for entry into the fuel cell at the stack anode inlet.

19. The method of claim 18, wherein the first or second surface of the heat exchanger is at least partly conical in shape.

20. The method of claim 18, wherein the body further includes a coolant input for injecting coolant into a channel of the heat exchanger, and a coolant output for receiving the coolant from the heat exchanger.

\* \* \* \* \*